United States Patent [19]
Carey

[11] 3,711,027
[45] Jan. 16, 1973

[54] EXTENDIBLE NOZZLE FOR ROCKET ENGINES

[75] Inventor: Lee F. Carey, North Tonawand, N.Y.

[73] Assignee: Textron Inc., Providence, R.I.

[22] Filed: March 17, 1971

[21] Appl. No.: 125,087

[52] U.S. Cl. ...........239/265.19, 60/271, 239/265.43
[51] Int. Cl. ...............................................B64c 15/00
[58] Field of Search.239/11, 265.11, 265.19, 265.33, 239/265.43, 534, 546, 602; 60/271

[56] References Cited

UNITED STATES PATENTS

| | | |
|---|---|---|
| 3,275,193 | 9/1966 | Barr ........................................222/1 |
| 3,494,513 | 2/1970 | Bauer...............................222/386.5 |

Primary Examiner—M. Henson Wood, Jr.
Assistant Examiner—Edwin D. Grant
Attorney—Bean & Bean

[57] ABSTRACT

An improved rocket engine nozzle extension of the type that is deployable from a compactly "stowed" condition to an extended length condition; such as following a rocket stage separation so as to increase the engine thrust and therefore range-payload capabilities. The invention has particular relation to the problem of providing a reduced rocket engine length (when "stowed") in engines of the large expansion ratio nozzle type; for application in rocket vehicle upper stages, space-craft, envelope limited missiles, and the like. The disclosure features use of a frusto-cone-shaped member formed of thin and lightweight convoluted ductile sheet material, to comprise the engine nozzle wall structure which is adapted to be unrolled in crease-free manner. The device is arranged in combination with a temporary cover member which is so attached to the nozzle exit end portion thereof as to seal therein gas pressure sufficient to cause the nozzle structure to unroll into its extended configuration. The cover is then jettisoned so as to operatively open the nozzle.

17 Claims, 7 Drawing Figures

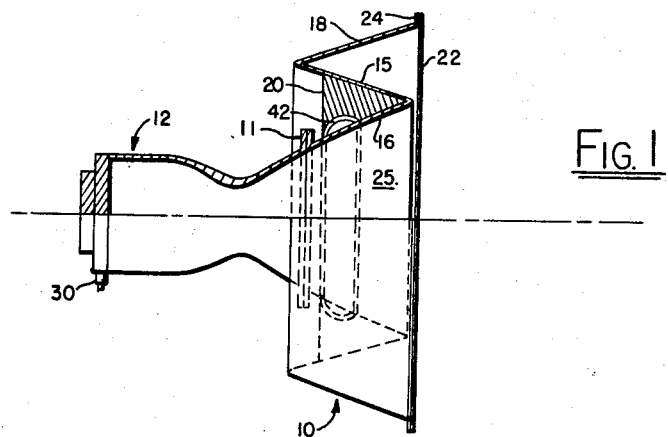
FIG. 1
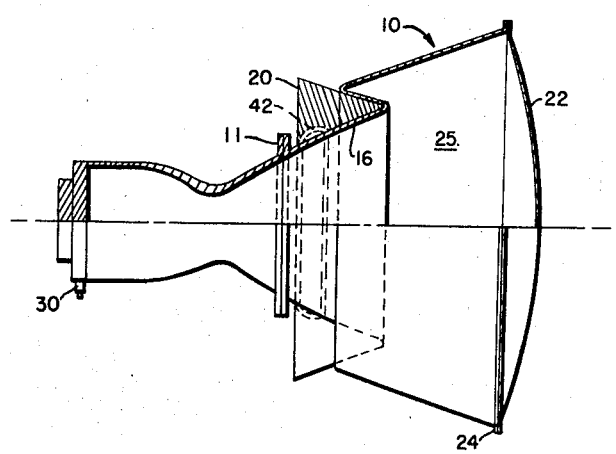
FIG. 2
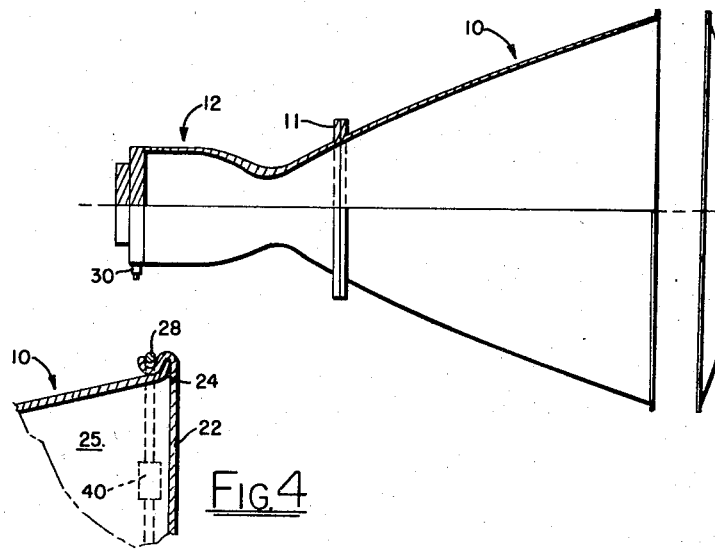
FIG. 3
FIG. 4
INVENTOR.
LEE F. CAREY
BY
Bean & Bean
ATTORNEYS

EXTENDIBLE NOZZLE FOR ROCKET ENGINES

BACKGROUND OF THE INVENTION

The invention provides improvements in the art to which prior U.S. Pat. Nos. 3,183,664; 3,270,504; 3,346,186; 3,526,365; and British Patent No. 871,403 (6/1961) relate.

SUMMARY OF THE INVENTION

The invention contemplates use of a suitably heat-resistant signal sleevelike member formed of ductile metal or other suitable material to comprise the nozzle structure. The member may be initially fabricated to a frusto-conical configuration, and then telescopically rolled into convolute form whereby to be suitably compact in longitudinal dimension when in its "stowed" or inoperative condition. Alternatively, the member may be fabricated by molding or electroforming processes or the like, or by welding together preformed cuff-shaped pieces. The member may be formed of a single suitably ductile and heat and erosion-resistant material; or, it may comprise a laminate of suitable materials; or, a ductile basis material plated with a heat-erosion-resistant material. In any case the device is then adapted to be attached at its smaller diameter end portion to the exit port of a rocket engine; it being understood that the nozzle structure will in each case be suitably sized and otherwise designed for attachment to a specific engine.

A temporary cover member is attached to the exit end portion of the nozzle in such manner as to seal the nozzle exit against internal gas pressures such as are sufficient to cause the nozzle structure to unroll and deploy into extended configuration. However, the interconnection of the nozzle and the temporary cover is arranged to be such that the cover will be readily jettisoned after the nozzle is so deployed, thereby rendering the engine and its extended nozzle fully operable. Any suitable arrangement may be employed for supplying the deploying gas pressure (hot or cold); such as by means of a solid or liquid fuel gas generator, or a pressure bottle; or by means of controlled (slow) start of the engine itself. The means for temporarily maintaining the cover on the nozzle during the deployment process and for releasing it to be jettisoned may be any suitable self-releasing device, such as would be responsive to excess gas pressure forces interiorly of the deployed nozzle. Or, it may be of the externally controlled type as will be explained hereinafter.

Thus, it will be appreciated that it is a general object of the present invention to provide an improved extendible nozzle system for rocket engines.

A more specific object is to provide a nozzle structure that may be in-rolled and stowed in a compact arrangement; and then subsequently rapidly self-extended so as to render the nozzle operative without necessity for use of complex accessory actuating equipment such as motors, gears, tracks, and the like.

Another object of the invention is to provide an extendible nozzle that will automatically guide itself to deploy in self-aligning symmetrical manner; and will then rigidify itself in the prescribed configuration after extension has been effected.

These and other objects and advantages of the invention will become apparent upon reference to the following specification and drawing, wherein:

THE DRAWING

FIG. 1 is a parti-elevational/sectional view of a rocket engine and nozzle construction of the present invention showing a device of the invention when in "stowed" condition;

FIG. 2 is a view corresponding to FIG. 1 but showing the relation of the various elements thereof when the nozzle device is in a partially deployed condition;

Figure 5:
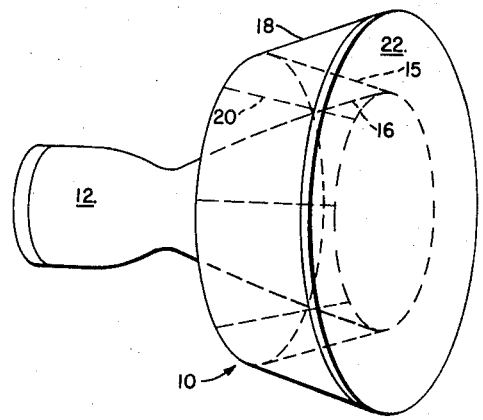
Figure 6:
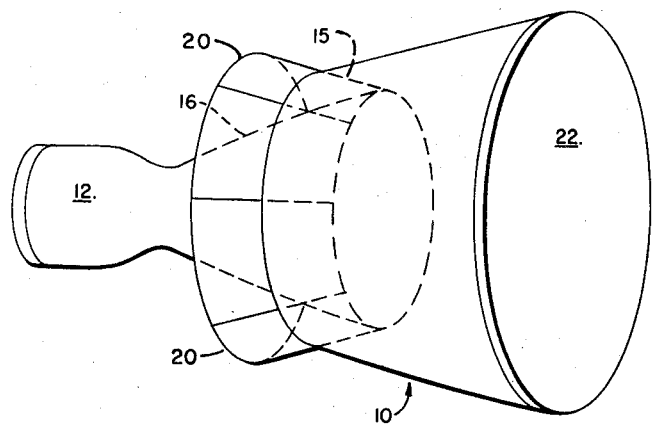

FIG. 3 corresponds to FIG. 2 but shows the nozzle device when in its fully extended and operative condition;

FIG. 4 is a fragmentary sectional view, on enlarged scale, showing one form of temporary cover attachment such as may be employed in conjunction with the invention;

FIG. 5 is a perspective view corresponding to FIG. 1 and showing the nozzle device in compactly stowed condition;

FIG. 6 is a perspective view corresponding to FIG. 2; and

Figure 7:
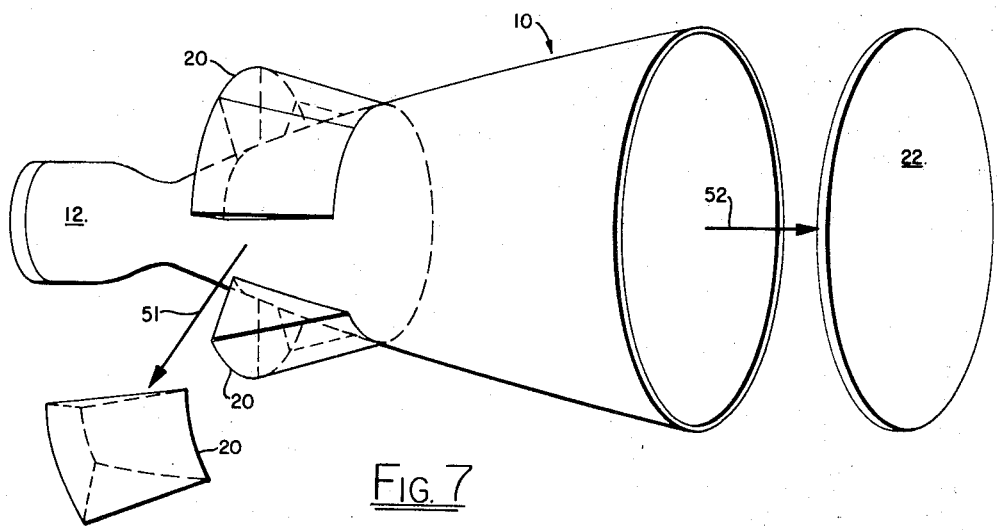

FIG. 7 is a perspective view corresponding to FIG. 3, but showing how the temporary "cover" and temporary "filler" devices of the present invention are jettisoned incidental to deployment of the nozzle device of the present invention.

DESCRIPTION OF A PREFERRED EMBODIMENT

As shown in the drawing herewith, a preferred embodiment of the invention may be constructed to comprise a frustoconically or bell-shaped sleeve which is designated herein generally by numeral 10, and which is formed of thin and lightweight heat-resistant material such as by way of example material known in the trade as "columbium C–103." At its smaller end the device is dimensioned so as to be adapted to be permanently fixed as indicated at 11 to the exit orifice of a typically available type rocket engine such as is indicated generally by the numeral 12. The nozzle structure is initially inter-rolled into convolute form, whereby an intermediate larger diameter portion 15 thereof encircles at least a portion of a smaller diameter mounting end portion 16 thereof. A still larger diameter portion 18 thereof encircles the exit end portion of the overall assembly. Thus the nozzle sleeve structure is longitudinally compacted into the reduced length dimension for installation as illustrated by FIG. 1. However, it is to be understood that the device may be otherwise initially fabricated; such as by way of examples; by an injection molding or electroforming process; or by welding together three separately formed cuff-shaped sections; in order to provide the device as shown herein at FIGS. 1, 5. Also, the device may be formed of any other suitably ductile and heat and erosion-resistant material or laminates thereof. For example, a ductile steel may be coated with columbium to provide the desired structure.

A combination positional stabilizing and deployment control mechanism is optionally provided in the form of a lightweight "filler" material formed of aluminum honeycomb or the like as shown at 20. Preferably, this mechanism is segmented and spring-loaded for jettisoning ejection after release by un-rolling of the convoluted nozzle, as is illustrated by means of FIG. 7 herewith. In the meantime the filler material segments 20 function to positionally stabilize the convoluted portions of the nozzle structure, and to unify and guide the un-rolling operation thereof.

As illustrated at 22, a temporary cover device is detachably mounted upon the rim 24 of the exit end portion of the nozzle member 10; thereby providing interiorly of the cone 10 a pressure-tight chamber 25. This cover member may be formed of any suitably lightweight material such as a sheet of metal or rubber or paper or plastic or cloth, or the like; and is attached thereto in such manner as to successfully resist internal gas pressures such as are sufficient to displace the cover and cause it to force the cone 10 to unroll from the in-folded condition shown in FIG. 1 to the straight-line extended condition shown in FIG. 3. Thus, in accordance with one concept of operation of the device, upon separation of the preceding stage from the propulsion assembly and pressurizing of the chamber 25, the pressure internally thereof will extend the nozzle 10 from the condition shown at FIGS. 1, 5, to the condition shown at FIGS. 3, 7.

The deployment pressure force may be supplied in any preferred manner. For example, it may be furnished by a small auxiliary pressure bottle, or "squib," or other fluid pressure generator coupled into the system by means of an inlet connection as illustrated at 30, under control of the operating pilot. Or, alternatively, the rocket engine per se may be employed to furnish the required deployment pressure forces via means of a controlled "slow start" procedure.

Also, the cover jettisoning operation may be readily arranged for by a variety of suitable means. For example, the cover may be attached to the exit end of the cone 10 simply by means of an adhesive. Or, the peripheral edge of the cover 22 may be flanged as shown at FIG. 4 to spring-lock behind the flange 24 formed on the end of the cone 10. In either case, the connection would be established in such manner that whereas it would withstand internal gas pressures competent to force the covered cone to deploy from the condition shown at FIGS. 1, 5, to the condition shown at FIGS. 3, 7, the connection would be overcome and release the cover to jettison therefrom as illustrated at 52 (FIG. 7) in response to pressures in excess thereof. Thus, the deployment of the nozzle device and jettisoning of the cover may be sequentially timed and/or otherwise controlled simply through regulation of the gas pressure supply; whether it originates from an external source or from a "slow engine start" procedure.

On the other hand, with a view to providing a more certain control arrangement, it may be preferred to include a more positive cover lock arrangement such as a hoop cable or ring or the like as shown at 28 (FIG. 4) which includes an explosive type connector as shown at 40. Thus, the deployment and jettisoning operations may be kept entirely separate and under more certain control of the operating pilot.

FIGS. 2, 7, illustrate how the pre-packaged segmental fillers 20 may be arranged so as to be readily jettisoned upon unrolling of the cone 10. As shown, this device may be fabricated to comprise a series of segmental-shaped blocks formed of lightweight filler material such as aluminum foil honeycomb stock or the like, which are externally shaped so as to complement the shape of the fold cavity between the cone parts 15, 16. The device is thus operable to "package" the cone when retracted, and to protect it against external hazard deformations. Also, this filler material operates to back-up the cone member 10 while being deployed against internal pressure forces such as might tend to buckle the cone. Therefore, the only degree of freedom left to the convoluted section when undergoing deployment is translational by roll-out in its axial direction. Simple spring devices such as are indicated at 42 may be employed to cause the segments to eject radially away from the cone 10 when they are released by unrolling of the cone as illustrated herein at 51 (FIG. 7).

Since the pressure required to roll the convoluted section is directly proportional to the roll-through angle and inversely proportional to the local diameter, the nozzle is self aligning during deployment. For example, if one side should start to lead the opposite side due to material anomalies, it must roll the metal through a larger angle than the opposite side and would advance into a smaller local diameter, both requiring larger rolling forces than available. This would restrict the lead until the lagging side caught up and pressure rose to the value required to continue symmetrical rolling. Being fabricated of ductile material, the formerly convolute configuration thus straightens out and assumes a crease-free cone-shaped form.

Thus, it will be appreciated that the rocket nozzle of the present invention features essentially a single lightweight member; which is self-stabilizing as it unrolls into a finally rigidly stabilized ideal thrust nozzle configuration, conforming precisely to its prescribed symmetry and dimensions. Thus, the nozzle device of the invention requires no accessory deploying power equipment, such as for example is required in connection with previously proposed nozzle extension devices. It is also to be understood that the nozzle of the invention is uniquely adapted for attachment to any existing engines; and in all cases will deploy and operate with maximum reliability.

I claim:

1. An extendible nozzle for a rocket engine comprising:
   a single, ductile, heat and erosion-resistant frusto-cone like sheet metal member being initially of convoluted form to define a first frusto-conical section having its smaller diameter end portion adapted to be permanently fixed to the exit port of a rocket engine to form a smooth divergent continuation of such exit port and to comprise the intake end of said nozzle, a frusto-conical terminal end portion comprising the discharge end of said nozzle and surrounding said first portion, and an intermediate portion of said member joining said first and terminal portions whereby the overall length dimension of said member is substantially less than the total of the length dimensions of said nozzle when extended, said intermediate portion comprising a reverse-directed frusto-conical member joined at its smaller diameter end to the larger diameter end of said first portion along a first circular fold line lying in a plane perpendicular to the axis of said first section and joined at its larger diameter end to the smaller diameter end of said terminal end portion along a second circular fold line also lying in a plane perpendicular to said axis and of larger diameter than said first fold line, and said intermediate portion defining a compression-resistant connection between said terminal end portion and said first portion to allow said terminal end portion to extend by unrolling of said second fold line only while such unrolling fold line seeks continually to remain in a plane perpendicular to said axis, and means for causing said member to unroll along said second fold line and to extend in smooth directional continuity throughout its extended length.

2. An extendible nozzle for a rocket engine as set forth in claim 1 wherein said means for causing said member to unroll comprises a cover and means temporarily attaching said cover to said larger diameter end portion so as to resist gas pressures thereagainst sufficient to remain connected to said end portion while forcing the member to unroll.

3. An extendible nozzle for a rocket engine as set forth in claim 2 wherein said means for causing said member to unroll includes a pressured gas supply means leading into the interior of said member and cover assembly.

4. An extendible nozzle for a rocket engine as set forth in claim 3 wherein said attachment means comprises spring fitted cooperating flange means on said member and cover respectively.

5. An extendible nozzle for a rocket engine as set forth in claim 3 wherein said attachment means includes an explosive disconnect device.

6. An extendible nozzle for a rocket engine as set forth in claim 3 wherein said attachment means comprises an adhesive substance.

7. An extendible nozzle for a rocket engine as set forth in claim 2 wherein said means for causing said member to unroll comprises the pressured gas discharge from the attached rocket engine.

8. An extendible nozzle for a rocket engine as set forth in claim 1 wherein said ductile and heat and erosion-resistant member is formed of "columbium C-103."

9. An extendible nozzle for a rocket engine as set forth in claim 1 wherein said member comprises a laminate including suitable ductile and heat and erosion-resistant materials.

10. An extendible nozzle for a rocket engine as set forth in claim 1 wherein said member comprises a ductile basis material coated with columbium.

11. An extendible nozzle for a rocket engine as set forth in claim 1 wherein said member comprises a ductile basis material coated with a ductile heat and erosion-resistant material.

12. An extendible nozzle for a rocket engine comprising:

a single, ductile, heat and erosion-resistant frusto-cone like sheet metal member being initially of convoluted form to define an inner frusto-conical section having its smaller diameter end portion adapted to be permanently fixed to the exit port of a rocket engine to form a smooth divergent continuation of such exit port and to comprise the intake end of said nozzle, a frusto-conical terminal end portion thereof comprising the discharge end of said nozzle and in surrounding, parallel relation to said first portion, and an intermediate portion of said member joining said first and terminal portions whereby the overall length dimensions of said member is substantially less than the sum total of the length dimensions of said nozzle when extended, said intermediate portion comprising a reverse-directed frusto-conical member joined at its smaller diameter end to the larger diameter end of said first portion along a first circular fold line lying in a plane perpendicular to the axis of said first section and joined at its larger diameter end to the smaller diameter end of said terminal end portion along a second circular fold line also lying in a plane perpendicular to said axis and of larger diameter than said first fold line, and said intermediate portion defining a compression-resistant connection between said terminal end portion and said first portion to allow said terminal end portion to extend by unrolling of said second fold line only while such unrolling fold line seeks continually to remain in a plane perpendicular to said axis 13. An extendible nozzle for a rocket engine as set forth in claim 12 wherein said ductile and heat and erosion-sion-resistant member is formed of "columbium C-103."

14. An extendible nozzle for a rocket engine as set forth in claim 12 wherein said member comprises a laminate including suitable ductile and heat and erosion-resistant materials.

15. An extendible nozzle for a rocket engine as set forth in claim 12 wherein said member comprises a ductile basis material coated with columbium.

16. An extendible nozzle for a rocket engine as set forth in claim 12 wherein said member comprises a ductile basis material coated with a ductile heat and erosion-resistant material.

17. In combination with a rocket engine of the type having a convergent section, a throat and a divergent section extending from the throat and terminating in an exit nozzle end of selected sectional area producing a fixed expansion ratio for the engine, a selectively extensible nozzle extension assembly for said rocket engine to increase said expansion ratio, said extension assembly comprising:

a convoluted generally frusto-conical sheet metal member having at least two convolutions to define a first frusto-conical portion having a free end joined to said divergent section of the rocket engine and forming a smooth divergent continuation of and from said exit end thereof, a terminal frusto-conical portion nexted around said first portion and having a free end defining a supplemental exit nozzle having a sectional area substantially greater than the sectional area of said exit nozzle end of the rocket engine, and a reverse-directed frusto-conical intermediate portion between and joining said first and terminal portions, a cover member on the free end of said terminal portion to close off the supplemental exit nozzle thereof and to define a closed space within the rocket engine and extension assembly, and means detachably securing the cover member to said terminal portion for causing said convolutions to unroll in response to pressurization of said closed space and to deploy said portions into a divergent, smooth and crease-free extension of said divergent section of the rocket engine.

* * * * *